US011838268B2

(12) United States Patent
Hao (10) Patent No.: US 11,838,268 B2
(45) Date of Patent: Dec. 5, 2023

(54) METHOD, DEVICE AND SYSTEM FOR DATA COMMUNICATION CONTROL

(71) Applicant: Ankang Hongtian Science & Techonology Incorporated Company, Shaanxi (CN)

(72) Inventor: Lihong Hao, Shaanxi (CN)

(73) Assignee: Ankang Hongtian Science & Technology Incorporated Company, Ankang (CN)

( * ) Notice: Subject to any disclaimer, the term of this patent is extended or adjusted under 35 U.S.C. 154(b) by 232 days.

(21) Appl. No.: 17/002,876

(22) Filed: Aug. 26, 2020

(65) Prior Publication Data

US 2021/0344646 A1 Nov. 4, 2021

(30) Foreign Application Priority Data

Apr. 29, 2020 (CN) .......................... 202010358538.5

(51) Int. Cl.
*H04L 29/06* (2006.01)
*H04L 9/40* (2022.01)
(Continued)

(52) U.S. Cl.
CPC .... *H04L 63/0236* (2013.01); *H04L 12/40032* (2013.01); *H04L 63/20* (2013.01); *H04L 65/1016* (2013.01); *H04L 65/1104* (2022.05)

(58) Field of Classification Search
CPC ....... H04L 12/66; H04L 63/02; H04L 63/029; H04L 63/0218; H04L 69/22; H04L 63/20; H04L 63/1416; H04L 65/1016; H04L 65/1069; H04L 45/68; H04L 12/122; H04L 45/741; G06F 21/53; G06F 13/28; G06F 13/382; G06F 13/4022; G06F 21/554;
(Continued)

(56) References Cited

U.S. PATENT DOCUMENTS 6,549,966 B1 * 4/2003 Dickens .............. G06F 13/4022
710/316
8,990,470 B1 * 3/2015 Sala .................... G06F 13/4022
710/305
9,185,141 B2 * 11/2015 Perkuhn .................. H04W 8/06
(Continued)

FOREIGN PATENT DOCUMENTS

| CN | 107968775 A | 4/2018 |
| CN | 109218320 A | 1/2019 |
| CN | 104521218 B | 5/2019 |

*Primary Examiner* — Dustin Nguyen (57) ABSTRACT

Disclosed are a method, a device and a system for data communication control. In the method for data communication control, data sent from a first communication device is received by a data forwarding device, where the data is transmitted through at least two types of physical interfaces in sequence. The data is then forwarded by the data forwarding device to a second communication device that is preconfigured. During the process of sending the data by the first communication device, the data is physically isolated by at least two types of physical interfaces, and then forwarded to the second communication device that is preconfigured. Even if the first communication device is illegally invaded by outsiders, the outsiders only know the IP address of the first communication device but fail to know the IP address of the destination of the physically isolated data.

6 Claims, 3 Drawing Sheets

Computing device (51) Int. Cl.
*H04L 12/40* (2006.01)
*H04L 65/1016* (2022.01)
*H04L 65/1104* (2022.01)

(58) Field of Classification Search
CPC ............... G06F 13/102; G06F 13/385; G06F 13/4045; H04W 8/06
See application file for complete search history.

(56) References Cited

U.S. PATENT DOCUMENTS

| | | | | |
|---|---|---|---|---|
| 9,237,125 | B1* | 1/2016 | Bardgett | H04L 63/02 |
| 9,258,140 | B2* | 2/2016 | Madaiah | H04L 45/68 |
| 2008/0276003 | A1* | 11/2008 | Dudley | H04L 65/1016 709/242 |
| 2009/0175283 | A1* | 7/2009 | Jan | G06F 13/4045 370/401 |
| 2012/0195303 | A1* | 8/2012 | Pujic | H04L 65/1069 370/352 |
| 2013/0318261 | A1* | 11/2013 | Cheng | G06F 13/385 710/62 |
| 2014/0115654 | A1* | 4/2014 | Rogers | H04L 63/20 726/1 |
| 2015/0215434 | A1* | 7/2015 | Singh | H04L 45/741 370/467 |
| 2015/0229563 | A1* | 8/2015 | Luo | H04L 69/22 370/392 |
| 2015/0370747 | A1* | 12/2015 | Robinson | G06F 13/382 710/313 |
| 2016/0117268 | A1* | 4/2016 | Griffin | G06F 13/102 710/10 |
| 2016/0306757 | A1* | 10/2016 | McCabe | G06F 13/28 |
| 2017/0192930 | A1* | 7/2017 | McKibben | H04L 12/66 |
| 2018/0270194 | A1* | 9/2018 | Beitler | G06F 21/554 |
| 2019/0026463 | A1* | 1/2019 | Touboul | H04L 63/1416 |
| 2019/0379683 | A1* | 12/2019 | Overby | H04W 12/122 |
| 2021/0036989 | A1* | 2/2021 | Fong | H04L 63/029 |
| 2021/0067487 | A1* | 3/2021 | Du | G06F 21/53 |
| 2022/0398210 | A1* | 12/2022 | Lessman | G06F 13/382 |

* cited by examiner

METHOD, DEVICE AND SYSTEM FOR DATA COMMUNICATION CONTROL

CROSS-REFERENCE TO RELATED APPLICATIONS

This application claims the benefit of priority from Chinese Patent Application No. 202010358538.5, filed on Apr. 29, 2020. The content of the aforementioned application, including any intervening amendments thereto, is incorporated herein by reference in its entirety.

TECHNICAL FIELD

The present application relates to data communication technique, and more particularly to a method, a device and a system for data communication control.

BACKGROUND

IP Multimedia Subsystem (IMS) is a reference architectural framework for delivering multimedia services over networks based on Internet Protocol (IP). IMS was originally designed by the 3rd Generation Partnership Project (3GPP) on the basis of the R5 version. Due to its unique advantages, IMS becomes the foundation for the convergence and evolution of fixed and mobile networks and is deployed as the technical standard for the new generation of network communications. IMS has broad applications because of its multimedia communication capability. Multiple IMS systems are now connected via IP networks directly, which has a security risk as unauthorized outsiders may readily get the IP addresses.

SUMMARY

Given the above, the present application provides a method, a device and a system for data communication control to overcome a security risk in communication across multiple IMS subsystems in the prior art.

The technical solutions of the present application are described as follows.

In a first aspect, the present application provides a method for data communication control, comprising:

receiving, by a data forwarding device, data sent from a first communication device; wherein the data is transmitted through at least two types of physical interfaces in sequence; and forwarding, by the data forwarding device, the data to a second communication device that is preconfigured.

In an embodiment, the data is transmitted through an IP network port and then a universal serial bus (USB) port.

In an embodiment, the method further comprises: determining whether the data conforms to a preset communication rule; and if yes, forwarding the data to the second communication device that is preconfigured; and no, intercepting the data.

In an embodiment, the preset communication rule is a Session Initiation Protocol (SIP).

In a second aspect, the present application provides a data communication control device, comprising:

a receiving module configured to receive data sent from a first communication device, wherein the data is transmitted through at least two types of physical interfaces in sequence; and a forwarding module configured to forward the data to a second communication device that is pre-configured.

In an embodiment, the data is transmitted through an IP network port and then a universal serial bus (USB) port.

In an embodiment, the data communication control device further comprises a judgment module configured to determine whether the data conforms to a preset communication rule, and if yes, the data is forwarded to the second communication device that is preconfigured; if no, the data is not forwarded.

In an embodiment, the preset communication rule is a session initiation protocol.

In a third aspect, the present application provides a data communication system, comprising a first IMS subsystem, a data forwarding device and a second IMS sub system;

wherein the first IMS subsystem comprises a first security isolation module; the first security isolation module comprises a first physical interface, a second physical interface and a first bridge submodule that bridges the first physical interface and the second physical interface;

the first physical interface is configured to receive data sent from a first communication device and transmit the data to the second physical interface through the first bridge submodule; the second physical interface is configured to transmit the data to the data forwarding device; wherein the first physical interface and the second physical interface differ in type;

wherein the data forwarding device is configured to forward the data to the second IMS subsystem that is preconfigured;

wherein the second IMS subsystem comprises a second security isolation module; the second security isolation module comprises a third physical interface, a fourth physical interface and a second bridge submodule that bridges the third physical interface and the fourth physical interface;

the third physical interface is configured to receive the data forwarded by the data forwarding device and transmit the data to the fourth physical interface through the second bridge submodule; the fourth physical interface is configured to transmit the data to a corresponding second communication device, wherein the third physical interface and the second physical interface are of the same type; and the fourth physical interface and the first physical interface are of the same type.

In an embodiment, the first physical interface and the fourth physical interface are both IP network ports; and the second physical interface and the third physical interface are both USB ports.

In an embodiment, the data forwarding device is configured to determine whether the data conforms to a preset communication rule, and if yes, the data is forwarded to the second communication device that is preconfigured; and if no, the data is intercepted.

In an embodiment, the preset communication rule is a session initiation protocol (SIP).

Compared to the prior art, the present application has the following beneficial effects.

During the process of sending data by the first communication device, the data is physically isolated by at least two types of physical interfaces, and then forwarded to the second communication device that is preconfigured, thereby realizing the data intercommunication with high security. Even if the first communication device is illegally invaded by outsiders, the outsiders only know the IP address of the first communication device, but fail to know the IP address of the destination of the physically isolated data, thereby improving the security of the communication between the first communication device and the second communication device.

BRIEF DESCRIPTION OF THE DRAWINGS

The accompanying drawings in the disclosure will be briefly described below to clearly illustrate the technical solutions of the present application. Obviously, the accompanying drawings are merely illustrative. Other drawings can be made by those skilled in the art based on the accompanying drawings without sparing any creative efforts.

The present application will be further described with reference to the embodiments and the accompanying drawings for the full illustration of the ends, functional features and advantages of the present application.

DETAILED DESCRIPTION OF EMBODIMENTS

The present application will be further described below with reference to the accompanying drawings of the present application to clearly and fully illustrate the technical solutions in the embodiments, so that the ends, features and advantages of the present application become clearer and more understandable. Obviously, the embodiments disclosed herein are merely intended to be exemplary. Any other embodiments made by those skilled in the art based on the embodiments of the present application without sparing any creative efforts shall fall within the scope of the present application.

Figure 1:
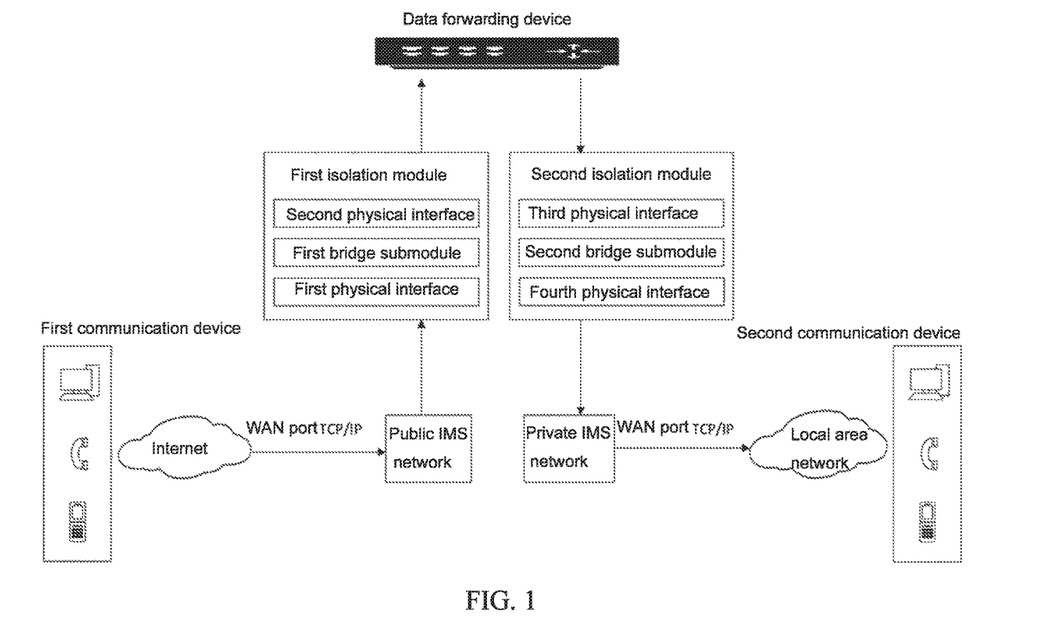
FIG. 1 shows a first environment applying a method for data communication control according to an embodiment of the present application.

FIG. 1 shows a first environment for applying a method for data communication control according to an embodiment. Referring to FIG. 1, the method for data communication control is applied to a data communication system. The data communication system includes a first IMS subsystem, a data forwarding device and a second IMS subsystem.

The first IMS subsystem includes a first security isolation module. The first security isolation module includes a first physical interface, a second physical interface and a first bridge submodule that bridges the first physical interface and the second physical interface. The first physical interface is configured to receive data sent from a first communication device and transmit the data to the second physical interface through the first bridge submodule. The second physical interface is configured to transmit the data to the data forwarding device. The first physical interface and the second physical interface differ in type.

The data forwarding device is configured to forward the received data to the second IMS subsystem that is preconfigured. In the present embodiment, the data forwarding device is a desktop terminal or a mobile terminal.

The second IMS subsystem includes a second security isolation module. The second security isolation module includes a third physical interface, a fourth physical interface and a second bridge submodule that bridges the third physical interface and the fourth physical interface. The third physical interface is configured to receive the data forwarded by the data forwarding device and transmit the data to the fourth physical interface through the second bridge submodule. The fourth physical interface is configured to transmit the data to a second communication device, where the third physical interface and the second physical interface are of the same type, and the fourth physical interface and the first physical interface are of the same type.

In this embodiment, the first physical interface and the fourth physical interface are both IP network ports. The second physical interface and the third physical interface are both USB ports. The first bridge submodule and the second bridge submodule are both Ethernet chips.

In an embodiment, the first physical interface is a first IP network port; the second physical interface is a first USB port; the first bridge submodule is a first Ethernet chip; the third physical interface is a second USB port; the fourth physical interface is a second IP network port; and the second bridge submodule is a second Ethernet chip. The data communication system using these elements has the following working principle.

Figure 2:
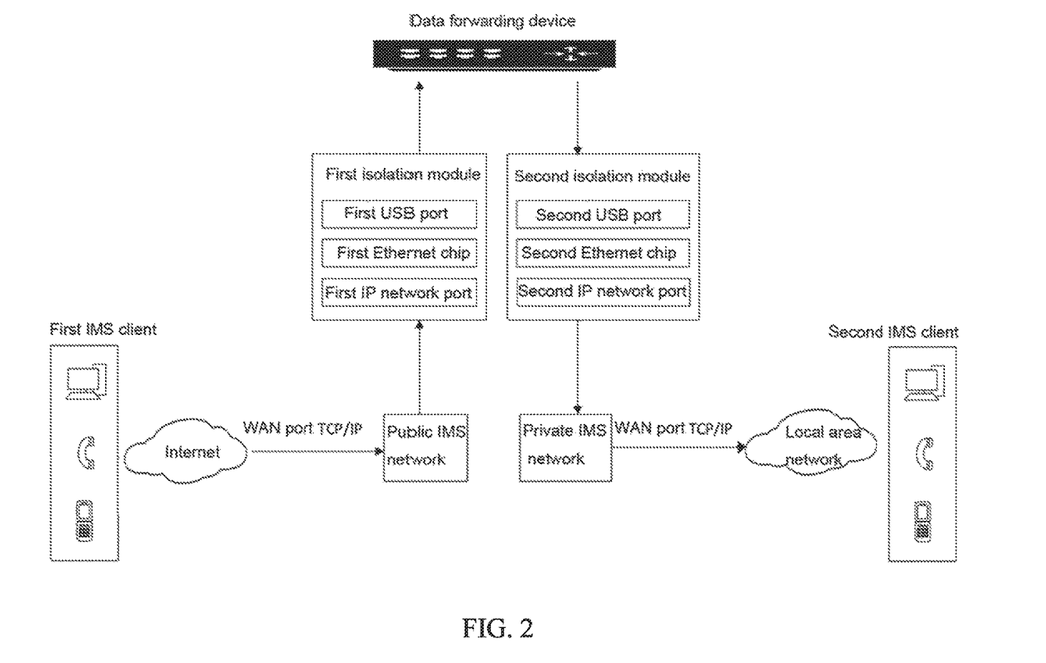
FIG. 2 shows a second environment applying the method for data communication control according to an embodiment of the present application.

As shown in FIG. 2, when multimedia communication between a first IMS client and a second IMS client in the local area network (LAN) is required, the Internet user inputs multimedia data to APP on the first IMS client and then clicks a send button on the APP. Subsequently, the multimedia data is transmitted to the first IMS subsystem via the Internet, specifically, the multimedia data is transmitted to the first IP network port on the first security isolation module. The first IP network port transmits the multimedia data, by means of pass-through, to the first USP port through the first Ethernet chip. The first USB port transmits the multimedia data to the data forwarding device. The data forwarding device forwards the multimedia data to the second IMS subsystem that is preconfigured, specifically, the multimedia data is forwarded to the second USB port on the second security isolation module. The second USB port transmits the multimedia data, by means of pass-through, to the second IP network port through the second Ethernet chip. The second IP network port transmits the multimedia data to the APP on the second IMS client through the LAN, so as to realize the multimedia communication between the first IMS client and the second IMS client.

In the present embodiment, even if outsiders illegally break into the first IMS subsystem without any authorization and obtain the IP address of the first IP network port, the outsiders fail to know which IMS subsystem the first USB port will communicate with, because when the multimedia data is transmitted outward through the first IP network port, the first IP network port no longer directly connects the second IMS subsystem through the IP network, instead, the multimedia data is transmitted, by means of pass-through, to the fist USB port through the first Ethernet chip. However, the data forwarding device preconfigures the intercommunication relationship between the IMS subsystems, and thus knows which IMS subsystem the first USB port will communicate with. When the multimedia data is transmitted from the first IMS subsystem, the data forwarding device forwards the multimedia data to the second IMS subsystem that is pre-configured, thereby realizing the multimedia communication between the first IMS subsystem and the second IMS subsystem. By physically isolating the data and preconfiguring the intercommunication relationship, the communication between the first IMS subsystem and the second IMS subsystem becomes more secure.

Under special conditions, the lack of restricting the data communication protocol leads to the following problems.
1) Once there is invalid data during the transmission process, normal communication between users is not allowed.
2) Once an illegal operation instruction is written by the outsiders during the transmission process, the security of communication will be compromised.

In an embodiment, the data forwarding device is configured to determine whether the data conforms to a preset communication rule, if yes, the data is forwarded to the second communication device that is preconfigured; if no, the data is not forwarded, so as to pass the qualified data and intercept the unqualified data, thereby improving the reliability and security of the communication between the first IMS subsystem and the second IMS subsystem.

Specifically, the preset communication rule is a Session Initiation Protocol (SIP), which encompasses text, images, sound and video.

Figure 3:
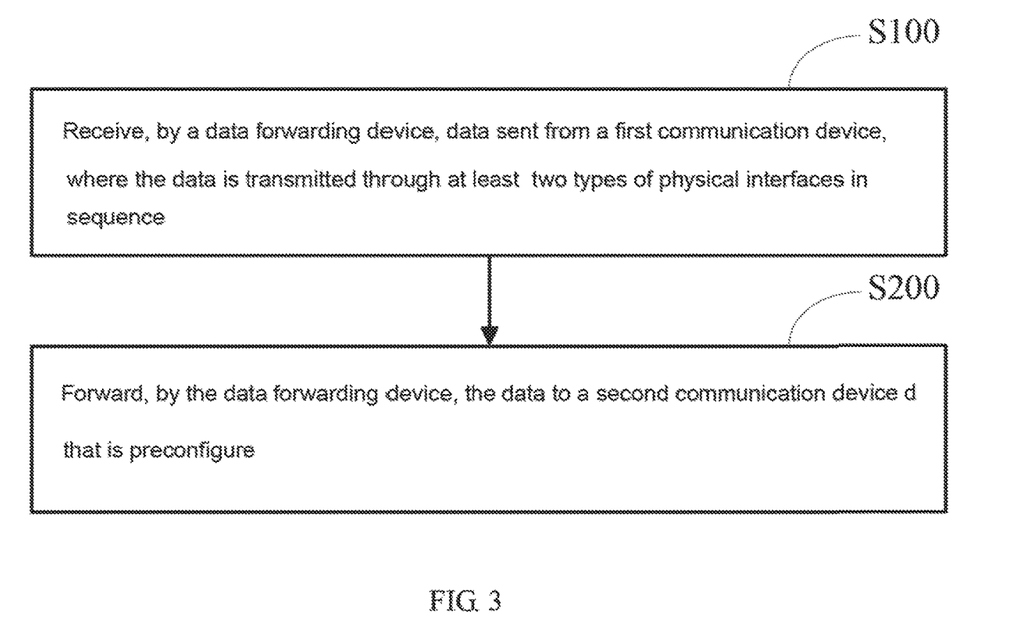
FIG. 3 is a flowchart of the method for data communication control according to an embodiment of the present application.

In an embodiment, a method for data communication control is provided, and FIG. 3 shows a flowchart of the method. In the present embodiment, the data forwarding device in FIG. 1 is used in the method for data communication control. Referring to FIG. 3, the method for data communication control includes the following steps.

S100) Data sent from a first communication device is received by a data forwarding device, where the data is transmitted through at least two types of physical interfaces in sequence.

Specifically, when data communication between the first communication device and the second communication device is required, the data sent from the first communication device is first transmitted to the first physical interface, and then to the second physical interface, and finally to the data forwarding device. The first physical interface and the second physical interface differ in type.

For example, when data communication between the first communication device and the second communication device is required, a user inputs the data required to APP on the first communication device and then clicks a send button. Subsequently, the data is transmitted to the first physical interface via the Internet. The first physical interface transmits the data, by means of pass-through, to the second physical interface through the first bridge submodule. The second physical interface transmits the data to the data forwarding device.

In the present embodiment, the data is transmitted through the IP network port and then the USB port.

S200) The data is forwarded, by the data forwarding device, to the second communication device that is preconfigured.

Specifically, the intercommunication relationship between the first communication device and the second communication device is preconfigured on the data forwarding device. After the data forwarding device receives the data sent from the first communication device, the data forwarding device forwards the data to the second communication device that is preconfigured.

For example, supposing that the data forwarding device is connected to a first communication device, a second communication device, a third communication device, a fourth communication device, a fifth communication device, a sixth communication device, a seventh communication device, an eighth communication device, a ninth communication device and a tenth communication device, respectively, in order to realize the communication between the third communication device and the eighth communication device, an intercommunication relationship between the third communication device and the eighth communication device needs to be preconfigured on the data forwarding device. When the data forwarding device receives the data sent from the third communication device, the data forwarding device forwards the data to the eighth communication device that is preconfigured. Likewise, in order to realize the communication between the fifth communication device and the seventh communication device, an intercommunication relationship between the fifth communication device and the seventh communication device needs to be preconfigured on the data forwarding device. When the data forwarding device receives the data sent from the fifth communication device, the data forwarding device forwards the data to the seventh communication device that is preconfigured. It can be seen that there is a one-to-one correspondence between the communication devices.

In the present embodiment, during the process of sending data by the first communication device, the data is physically isolated by at least two types of physical interfaces, and then forwarded to the second communication device that is preconfigured, thereby realizing the data intercommunication with high security. Even if the first communication device is illegally invaded by the outsiders, the outsiders only know the IP address of the first communication device, but fail to know the IP address of the destination of the physically isolated data, thereby improving the security of the communication between the first communication device and the second communication device.

In an embodiment, the method for data communication control further includes: determining whether the data conforms to the preset communication rule, and if yes, the data is forwarded to the second communication device that is preconfigured; if no, the data is not forwarded.

Specifically, the data forwarding device determines whether the data conforms to the preset communication rule, if yes, the data is forwarded to the second communication device that is preconfigured; if no, the data is not forwarded, so as to pass the qualified data and intercept the unqualified data, thereby improving the reliability and security of the communication between the first communication device and the second communication device.

Further, the preset communication rule is the Session Initiation Protocol, which encompasses text, images, sound and video.

It should be understood that in the flowcharts, the steps are arranged in a successive order as indicated by the arrows. However, there is no need to execute these steps in sequence according to the arrow indication. Unless specifically stated in the description, these steps are not limited in execution sequence, and can be executed in other orders. Moreover, at least part of the steps in each flowchart may include multiple sub-steps or multiple stages. These sub-steps or stages are not necessarily executed at the same time, but can be executed at different times. These sub-steps or stages are not necessarily executed in sequence, but can be executed alternately with other steps, sub-steps of the other steps or at least part of the stages.

Figure 4:
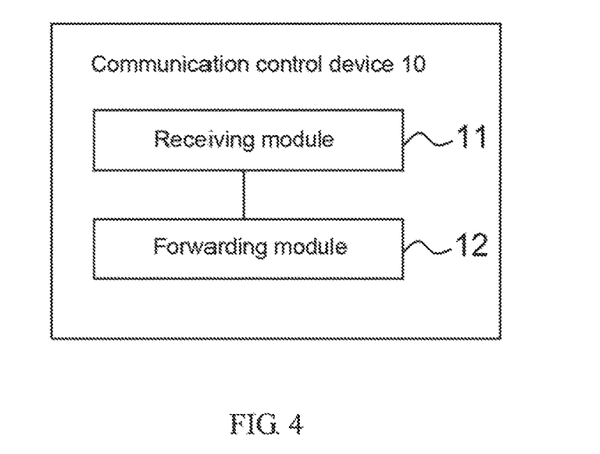
FIG. 4 is a schematic block diagram of a data communication control device according to an embodiment of the present application.

In one embodiment, a data communication control device 10, as shown in FIG. 4, is provided. The data communication control device 10 includes a receiving module 11 and a forwarding module 12.

The receiving module 11 is configured to receive data sent from the first communication device, where the data is transmitted through at least two types of physical interfaces.

The forwarding module 12 is configured to forward the data to the second communication device that is pre-configured.

In an embodiment, the data received by the receiving module 11 is transmitted through the IP network port and then the USB port.

In an embodiment, the data communication control device 10 further includes a judgment module configured to determine whether the data conforms to the preset communication rules, and if yes, the data is forwarded to the second communication device that is preconfigured; if no, the data is not forwarded.

In an embodiment, the preset communication rule in the judgment module is the SIP protocol.

In an embodiment, the judgment module can work independently and there is no need to connect the judgment module to any IP network.

It should be noted that the specific implementation process of the data communication control device in the embodiment is the same as that of the data communication control method, which has been described in the embodiments involving the method for data communication control and is not repeated herein.

Figure 5:
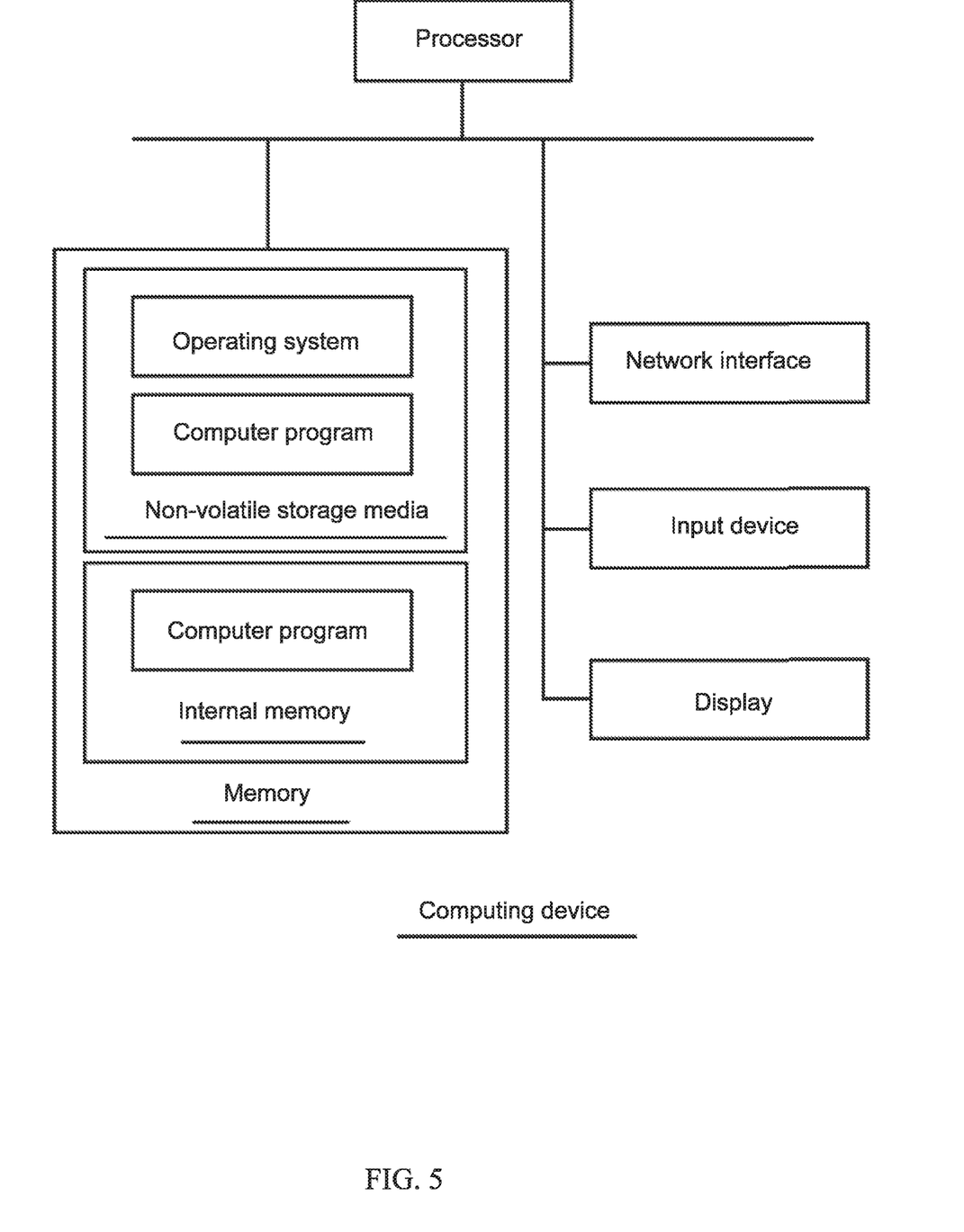
FIG. 5 is a schematic block diagram of a computing device according to an embodiment of the present application.

FIG. 5 shows an architecture of a computing device according to an embodiment. Specifically, the computing device may be the data forwarding device in FIG. 1. As shown in FIG. 5, the computing device includes a processor connected to a system bus, a memory, a network interface, an input device and a display screen. Where the memory is a non-volatile memory or an internal memory. An operating system or a computer program can be stored on the non-volatile memory. The computer program, when being executed by the processor, causes the processor to perform the method for data communication control. The computer program can also be stored on the internal memory. When being executed by the processor, the computer program causes the processor perform the method for data communication control. The display screen of the computing device can be a liquid crystal display screen or an electronic ink display screen. The input device of the computing device can be a touch screen layered on a top of the display screen, and also can be a button, a trackball or a touch pad provided on a casing of the computing device, and further can be a keyboard, a trackpad or a mouse that is external.

It can be understood by those skilled in the art that FIG. 5 is a block diagram merely showing the partial structure of the computing device of the present application. The block diagram shown in FIG. 5 is not intended to limit the computing device to which the technical solution of the present application is applied. Specifically, the computing device can include more or fewer parts than the computing device shown in the drawing, or combine some parts, or be provided with different parts.

In an embodiment, the data communication control device provided in the present application helps to execute a computer program. The computer program can operate in the computing device shown in FIG. 5. The memory of the computing device can store various program modules (such as the receiving module 11 and the forwarding module 12 shown in FIG. 4) that construct the data communication control device. The computer program consisting of several modules causes the processor to perform the method for data communication control in the embodiment of the present application.

For example, the computing device shown in FIG. 5 can receive the data sent from the first communication device through the receiving module 11 in the data communication control device shown in FIG. 4, where the data is transmitted through at least two types of physical interfaces. The computing device can forward the data to the second communication device that is preconfigured through the forwarding module 12.

Provided in an embodiment is a computer-readable storage medium on which a computer program executable by a processor is stored. The computer program, when being executed by the processor, causes the computer program to perform the method for data communication control. In this embodiment, the method for data communication control has the same steps as the method for data communication control in the embodiments mentioned above.

Provided in an embodiment is a computing device, which includes a processor and a memory on which a computer program executable by the processor is stored. The computer program, when being executed by the processor, causes the processor to perform the method for data communication control. In this embodiment, the method for data communication control has the same steps as the method for data communication control in the embodiments mentioned above.

An integration module can be stored on the computer-readable storage medium as a function module of a software, so as to sell or use the integration module as an independent product. Likewise, all or part of the technical solutions of the present application can be formed as a software product. The software product is stored on a storage medium and includes several instructions to cause a computing device (such as a personal computer, a server and a network device) to perform all or part of the steps of the method in the embodiments of the present application. The storage media is selected from various media that can store program codes consisting of a USB flash disk, a mobile hard disk, a Read-Only Memory (ROM), a Random-Access Memory (RAM), a diskette and an optical disc.

Each embodiment disclosed above has its own emphasis. Some descriptions are incomplete in an embodiment, but are detailed in other embodiments. Disclosed above are the method, the device, the system, the computer-readable storage medium and the computing device for data communication control. Specific embodiments and applications can be changed by those skilled in the art based on the spirit of the present application. In summary, the description of the present application is not intended to limit the scope as defined by the appended claims.

What is claimed is:

1. A method for data communication control in a data communication system,
   the data communication system comprising a first IMS subsystem, a data forwarding device and a second IMS subsystem, wherein
   the first IMS subsystem comprises a first physical interface, a second physical interface and a first bridge that bridges the first physical interface and the second physical interface, the first physical interface and the second physical interface differ in type;
   the second IMS subsystem comprises a third physical interface, a fourth physical interface and a second bridge that bridges the third physical interface and the fourth physical interface;
   the third physical interface and the second physical interface are of the same type, and the fourth physical interface and the first physical interface are of the same type; and
   the data forwarding device preconfigures intercommunication relationship between the first IMS subsystem with the second IMS subsystem, and preconfigures intercommunication relationship among a plurality of communication devices, and the data forwarding device is a desktop terminal or a mobile terminal;

the method comprising:

receiving, by the data forwarding device, data sent from a first communication device, wherein the data is transmitted through the first IMS subsystem;

determining, by the data forwarding device, the second IMS subsystem that is in preconfigured intercommunication relationship with the first IMS subsystem by determining that the second physical interface of the first IMS subsystem is in communication with the second IMS subsystem;

determining, by the data forwarding device, a second communication device that is in preconfigured intercommunication relationship with the first communication device; and forwarding, by the data forwarding device through the second IMS subsystem, the data to the second communication device that is preconfigured; and the method further comprising:

determining whether the data conforms to a preset communication rule; and if yes, forwarding the data to the second communication device that is preconfigured; and if no, intercepting the data;

wherein the preset communication rule is a Session Initiation Protocol (SIP).

2. The method of claim 1, wherein the data is transmitted through an IP network port and then a universal serial bus (USB) port.

3. A data communication control device, being a desktop terminal or a mobile terminal, comprising:

a processor; and a memory storing a computer program, wherein the computer program, when being executed by the processor, causes the processor to:

preconfigure intercommunication relationship between a first IMS subsystem with a second IMS subsystem, and preconfigure intercommunication relationship among a plurality of communication devices, wherein the first IMS subsystem comprises a first physical interface, a second physical interface and a first bridge that bridges the first physical interface and the second physical interface, the first physical interface and the second physical interface differ in type, the second IMS subsystem comprises a third physical interface, a fourth physical interface and a second bridge that bridges the third physical interface and the fourth physical interface, the third physical interface and the second physical interface are of the same type, and the fourth physical interface and the first physical interface are of the same type;

receive data sent from a first communication device; wherein the data is transmitted through the first IMS subsystem via the first and the second physical interfaces;

determine the second IMS sub system that is in preconfigured intercommunication relationship with the first IMS subsystem by determining that the second physical interface of the first IMS subsystem is in communication with the second IMS subsystem;

determine a second communication device that is in preconfigured intercommunication relationship with the first communication device; and forward, through the second IMS subsystem via the third and the fourth physical interfaces, the data to the second communication device that is pre-configured; and the computer program, when being executed by the processor, further causes the processor to:

determine whether the data conforms to a preset communication rule, and if yes, the data is forwarded to the second communication device that is preconfigured; if no, the data is not forwarded;

wherein the preset communication rule is a session initiation protocol (SIP).

4. The data communication control device of claim 3, wherein the data is transmitted through an IP network port and then a universal serial bus (USB) port.

5. A data communication system, comprising a first IMS subsystem, a data forwarding device and a second IMS subsystem;

wherein the first IMS subsystem comprises a first security isolation module; the first security isolation module comprises a first physical interface, a second physical interface and a first bridge submodule that bridges the first physical interface and the second physical interface;

the first physical interface is configured to receive data sent from a first communication device and transmit the data to the second physical interface through the first bridge submodule; the second physical interface is configured to transmit the data to the data forwarding device; wherein the first physical interface and the second physical interface differ in type;

wherein the data forwarding device is a desktop terminal or a mobile terminal, and the data forwarding device is configured to preconfigure intercommunication relationship between the first IMS subsystem with the second IMS subsystem, and preconfigure intercommunication relationship among a plurality of communication devices, determine the second IMS subsystem that is in preconfigured intercommunication relationship with the first IMS subsystem by determining that the second physical interface of the first IMS subsystem is in communication with the second IMS subsystem, determine a second communication device that is in preconfigured intercommunication relationship with the first communication device, and forward the data to the second IMS subsystem that is preconfigured; and wherein the second IMS subsystem comprises a second security isolation module; the second security isolation module comprises a third physical interface, a fourth physical interface and a second bridge submodule that bridges the third physical interface and the fourth physical interface;

the third physical interface is configured to receive the data forwarded by the data forwarding device and transmit the data to the fourth physical interface through the second bridge submodule; the fourth physical interface is configured to transmit the data to the second communication device, wherein the third physical interface and the second physical interface are of the same type; and the fourth physical interface and the first physical interface are of the same type; and the data forwarding device is configured to determine whether the data conforms to a preset communication rule, and if yes, the data is forwarded to the second communication device that is preconfigured; and if no, the data is not forwarded;

wherein the preset communication rule is a session initiation protocol.

6. The data communication system of claim 5, wherein the first physical interface and the fourth physical interface are both IP network ports; and the second physical interface and the third physical interface are both USB ports.

* * * * *